United States Patent [19]

Iura et al.

[11] Patent Number: 5,541,651
[45] Date of Patent: Jul. 30, 1996

[54] MULTI-FORMAT DIGITAL IMAGE PICKUP APPARATUS

[75] Inventors: Noriyuki Iura, Yokohama; Takuya Imaide, Fujisawa; Toshiro Kinugasa, Hiratsuka, all of Japan

[73] Assignee: Hitachi, Ltd., Tokyo, Japan

[21] Appl. No.: 245,674

[22] Filed: May 18, 1994

Related U.S. Application Data

[63] Continuation of Ser. No. 104,573, Aug. 11, 1993, Pat. No. 5,339,105.

[30] Foreign Application Priority Data

Aug. 26, 1992 [JP] Japan ................................. 4-226888

[51] Int. Cl.$^6$ ................................................. H04N 5/262
[52] U.S. Cl. ........................... 348/240; 348/222; 348/441; 348/445; 358/906
[58] Field of Search ................................ 348/222, 240, 348/358, 555, 556, 561, 638, 642, 704, 441, 445, 457, 458, 459; 358/906, 909.1, 41, 21 R, 909, 180, 227, 209; H04N 9/04, 3/223, 5/262

[56] References Cited

U.S. PATENT DOCUMENTS 5,272,524  12/1993  Nagumo ................................. 348/445

*Primary Examiner*—Safet Metjahic
*Assistant Examiner*—Sherrie Hsia
*Attorney, Agent, or Firm*—Antonelli, Terry, Stout & Kraus

[57] ABSTRACT

An image pickup apparatus which includes a timing pulse generator, an imager having an effective pixel number requiring a predetermined frequency for the horizontal scanning pulse in order to to produce a video signal having a normal aspect ratio and a video signal processing circuit for processing the signal outputted from the imager to generating a video signal. An electronic zoom signal processing circuit is provided for enlarging the video signal generated by the video signal processing circuit in the horizontal direction. The timing pulse generator supplies the imager with a horizontal pulse having a frequency higher than the predetermined frequency required by the effective pixel number of the image input element and the electronic zoom signal processing circuit enlarges the video signal generated in the horizontal direction to produce a video signal having a normal aspect ratio.

17 Claims, 6 Drawing Sheets

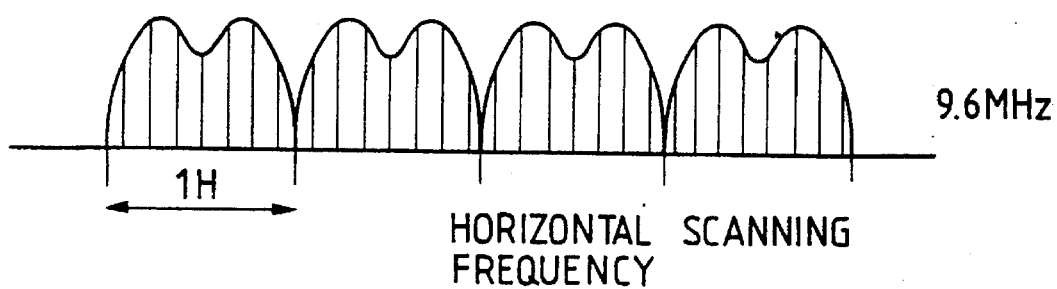
FIG. 4
PRIOR ART
1H
HORIZONTAL SCANNING FREQUENCY
9.6MHz
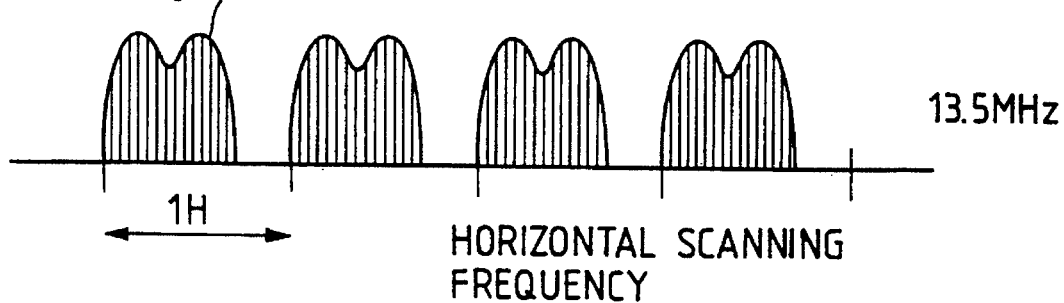
P₀ SAMPLES FIG. 5
1H
HORIZONTAL SCANNING FREQUENCY
13.5MHz
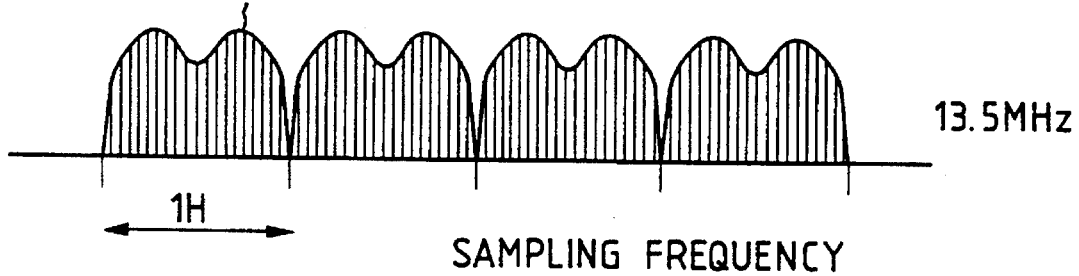
P SAMPLES FIG. 6
1H
SAMPLING FREQUENCY
13.5MHz

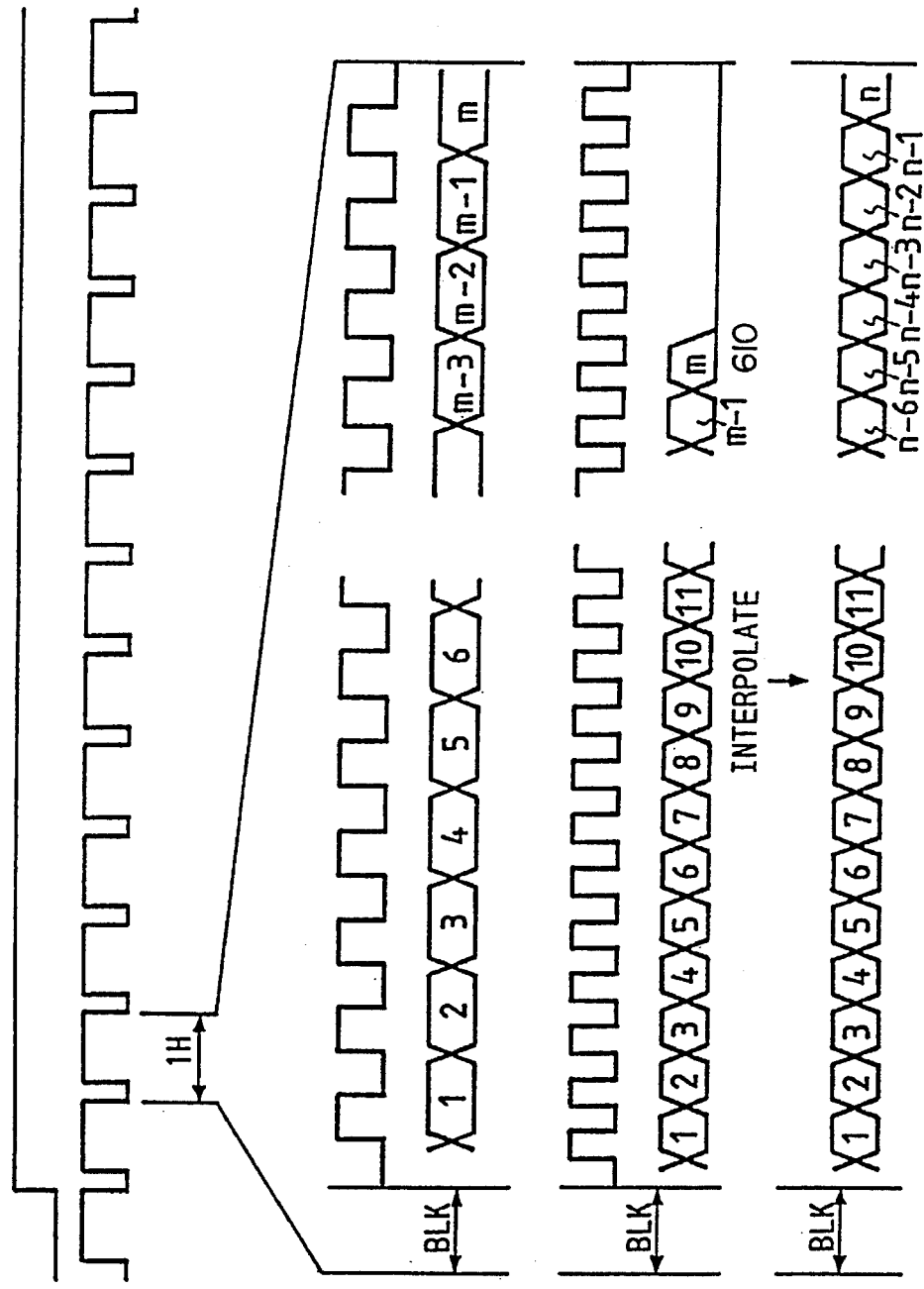

MULTI-FORMAT DIGITAL IMAGE PICKUP APPARATUS

This application is a continuation of application Ser. No. 08/104,573, filed Aug. 11, 1993, U.S. Pat. No. 5,339,105.

TECHNICAL FIELD

The present invention relates to an image pickup apparatus using an imager, more particularly the present invention relates to an image pickup apparatus to be connected to a digital transmission apparatus or a digital record apparatus.

BACKGROUND OF THE INVENTION

Since current and virtually all further telephone networks are and will be digital as opposed to analog, so-called TV phone service will enjoy wide spread use. TV phone service adds picture information to voice information which are communicated using a telephone network.

A typical signal standard, Common Intermediate Format (CIF) used in encoding a video signal for TV phone, different from a conventional video signal standard (NTSC system or the like), is described in the Journal of Institute of Television Engineers of Japan, Vol 46, No. 4, 1992, pp. 117–120 (Reference 1). When, for example, the CIF signal standard is used to encode a video signal for a TV phone, an image pickup element and an image pickup apparatus specifically designed to accommodate the CIF standard are required so as to constitute a TV phone. However, such an image pickup element is not manufactured at present, thereby requiring a video signal (analog signal) obtained from a currently available imager designed to accommodate, for example the NTSC signal standard to be converted into digital by processing of an analog/digital (A/D) converter, and converted into a sampling frequency to fit the CIF standard.

A typical embodiment of an imager is illustrated in FIG. 3. The imager 102 illustrated in FIG. 3 includes a plurality of photo diodes from which converted signal charges are transferred through vertical charge coupled devices (CCD)s to horizontal CCDs in synchronism with a horizontal scanning pulse. When the imager illustrated in FIG. 3 is used as in most applications as an NTSC imager the number of photo diodes therein is set to a particular value so as to provide the appropriate number of samples for the image. The number of photo diodes to be included in the imager is called the effective pixel number. For an NTSC imager the effective pixel number is 510 horizontal pixels and 492 vertical pixels. In order to read out all of the samples for each frame to be displayed at a normal aspect ratio, the horizontal scanning pulse is set to a particular frequency $f_0$. For the NTSC signal standard the frequency $f_0$ of the horizontal scanning pulse ms 9.6 MHz.

Aspect ratio is concerned with the dimensionally accurate display of an image using the complete screen relative to the dimensions of the actual object. For example, the image of an object shown in FIG. 8A is displayed at a normal aspect ratio in FIG. 8B as opposed to that shown in FIG. 8C. FIG. 8C illustrates an image being displayed at an aspect ratio wherein the video signal thereof is contracted in the horizontal direction.

Thus when the imager illustrated in FIG. 3 is operated as an NTSC imager the vertical and horizontal synchronous (SYNC) pulses shown in FIGS. 7A and 7B causes the generation of the horizontal scanning pulse shown in FIG. 7C as HCCD CLK which in turn causes the information to be output from the imager in the manner shown as CCD OUT in FIG. 7D. The imager operated in such a manner produces a video signal such as that shown in FIG. 4.

The CIF standard operates at a frequency of 6.7 MHz which is different from the video signal of a frequency of 9.6 MHz produced by currently available pickup elements. Thus, some type of conversion circuit is necessary in order to interface the video signal produced by currently available imager and telephone networks operating in accordance with the CIF signal standard.

Further, since there is a need for digitally recording the video signal from the imager a digital apparatus record is required. Development of a digital video tape recorder (VTR) for such an application has been difficult due to differences in the required signal standard of a digital VTR as described in the Journal of Institute of Television Engineers of Japan, Vol. 45, No. 2, 1991, pp. 67–70 (Reference 2), the CIF signal standard and the frequency of the video signal produced by currently available imager due to their construction. An image pickup apparatus suitable for a digital VTR for use with a telephone network has not yet been developed.

As described above, in order for a video signal to be converted into a digital signal of a sampling frequency of the CIF standard for use in a TV phone system, a problem exists in that a conversion circuit of large scale and complexity must be used. A large scale complex circuit is also required to convert a video signal to a digital signal having the sampling frequency of the digital VTR standard.

SUMMARY OF THE INVENTION

An object of the present invention is to provide an image pickup apparatus which generates digital video signals to fit the sampling frequency of the CIF standard or the digital VTR standard without being accompanied by an increase in the scale or complexity of the conversion circuit.

The present invention provides an image pickup apparatus which includes a timing pulse generator and an imager for outputting a signal in synchronization with a horizontal scanning pulse supplied from the timing pulse generator. The imager has an effective pixel number requiring a horizontal scanning pulse of a frequency $F_0$ to produce a video signal having a normal aspect ratio. Further provided in the present invention is a video signal processing circuit for processing the signal outputted from the imager and for generating a video signal and an electronic zoom signal processing circuit for enlarging the video signal generated by the video signal generator in the horizontal direction.

In order to attain the foregoing object, the frequency of the horizontal scanning pulse of the imager is set to a frequency f higher than that of the required frequency $f_0$ of the horizontal scanning pulse specified by the effective pixel number of the imager and the horizontal scanning period of the imager. Particularly, the frequency of the horizontal scanning pulse f is set to a frequency an integer (n) times the standardized sampling frequency f1 of the imager. That is, the frequency f of the horizontal scanning pulse is set to satisfy the following conditions:

$$f = nf1 \quad (n: \text{natural number}) \qquad (1)$$

$$f > f_0$$

The output of the imager is subjected to A/D conversion at sampling frequency f, using known technology described in Japanese patent application laid-open No. 4-10783. Interpolations are performed between the samples which have been subject to A/D conversion by an electronic zoom signal processing circuit to generate additional samples for use in the video signal so that the image represented by the samples are displayed at the proper aspect ratio filling a complete screen. More particularly, the electronic zoom processing circuit enlarges the image represented by the samples in the horizontal direction by $f/f_0$ times.

In the invention if the frequency of the horizontal scanning pulse of an imager is set to a frequency, for example n times the standardized sampling frequency f1, a video signal having a sampling frequency to fit the standard can be obtained by simply resampling the frequency f at 1/n. Also since $f>f_0$, a signal contracted in the horizontal direction is outputted from the imager, therefore a video signal having a normal aspect ratio cannot be obtained from the imager. A video signal of a normal aspect ratio can be obtained by enlarging the image from the imager $f/f_0$ times in the horizontal direction by the electronic zoom signal processing circuit.

The present invention also provides an embodiment in which recording of the video signal by a digital VTR is possible by providing an encoder for sampling the video signal enlarged by the electronic zoom signal processing circuit in a predetermined format. The predetermined format is that required according to the digital VTR standard. Images can also be reproduced from the digital VTR through a decoder included in the image pickup apparatus of the present invention and supplied to a monitor.

BRIEF DESCRIPTION OF DRAWINGS

FIG. 4 is a timing chart showing an output signal from an image pickup apparatus conventionally operated;

FIG. 5 is a timing chart showing output signals from an image pickup apparatus according to the first and second embodiments of the invention;

FIG. 6 is a timing chart showing a video signal output from an electron zoom signal processing circuit according to the first and second embodiments of the invention.

FIGS. 7A–F are timing charts of the signals of the image pickup apparatus operated in the convetional manner;

FIGS. 7G are timing charts of the signals of the electronic zoom processing circuit in accordance with the invention.

DETAILED DESCRIPTION OF THE PREFERRED EMBODIMENTS

Figure 1:
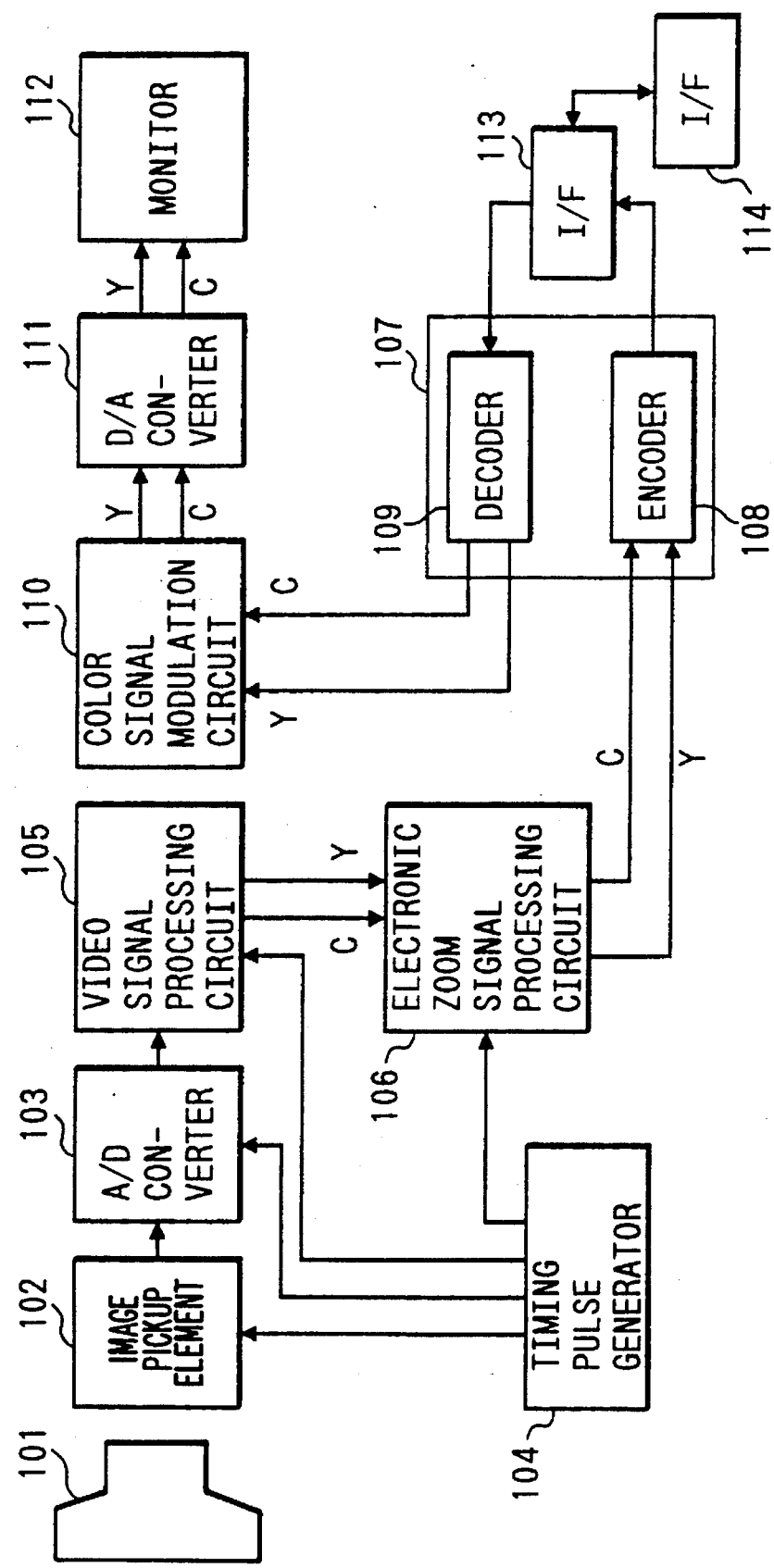
FIG. 1 is a block diagram showing an image pickup apparatus according to the first embodiment of the invention.

FIG. 1 is a diagram of an image pickup apparatus according to the first embodiment of the present invention. The image pickup apparatus includes means to designate a lens 101, an imager 102, an A/D converter 103, a timing pulse generator 104, a video signal processing circuit 105, an electronic zoom signal processing circuit 106, an encoding device 107, an encoder 108, a decoder 109, a color signal modulation circuit 110, an digital to analog (D/A) converter 111, a monitor 112, a first transmission I/F circuit 113, and a second transmission I/F circuit 114, connected to the first transmission I/F circuit 113, by a telephone network.

The timing pulse generator 104 and the electronic zoom signal processing circuit 106 may be such as that taught by an "An Electronic Zoom Video Camera Using Imager Scanning Control" by T. Kinugasa, IEEE, 1991, pp. 46–49. The decoder 109 and the encoder 108 may be such as that taught by the LSI logic CCITT video compression chip set Technical note.

Figure 3:
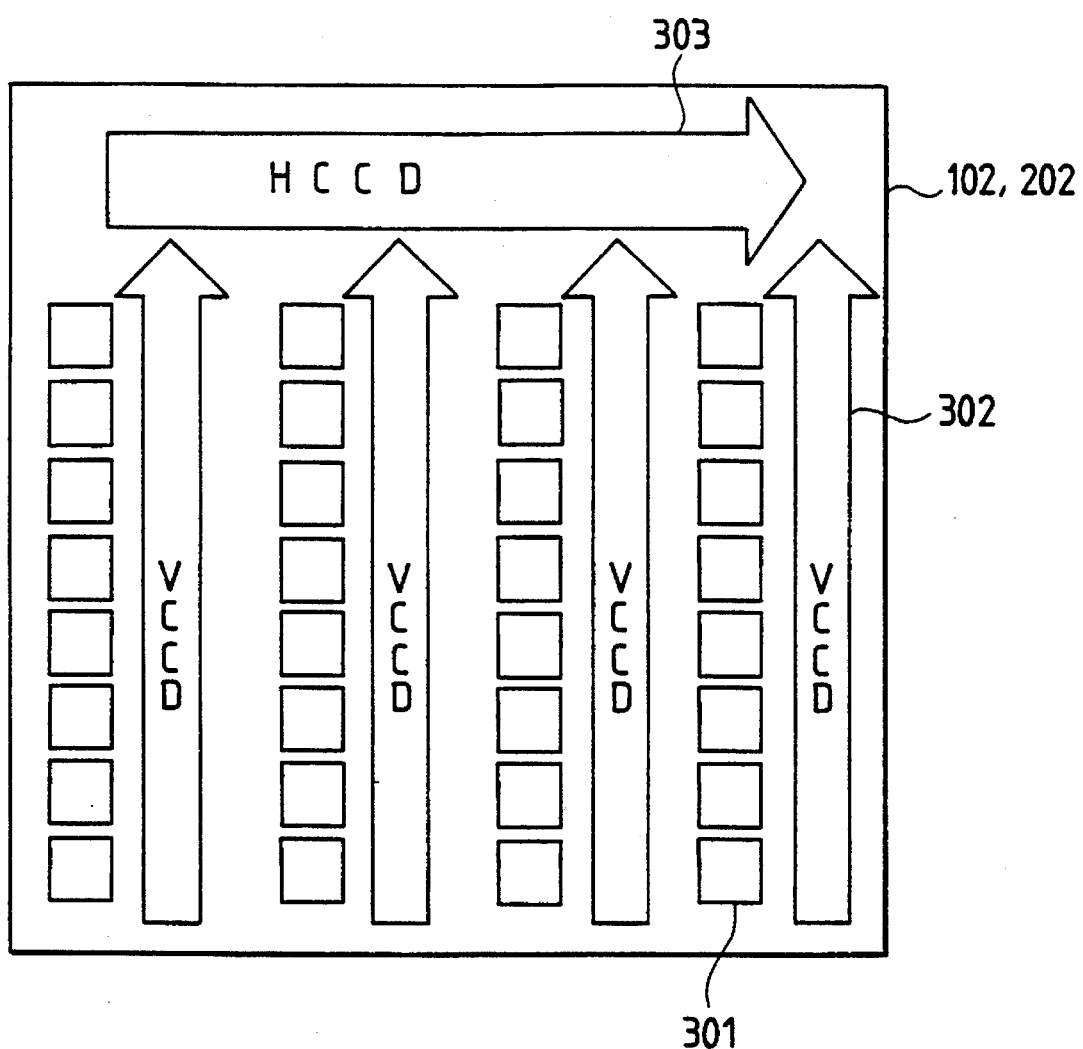
FIG. 3 is block diagram showing inner construction of an imager used in the first and second embodiments of the invention.
Figure 8A:
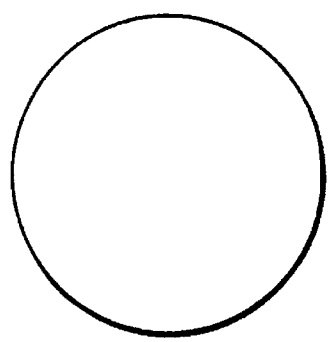
FIGS. 8A–C are diagrams showing an object being displayed at normal and abnormal aspect ratios.
Figure 8B:
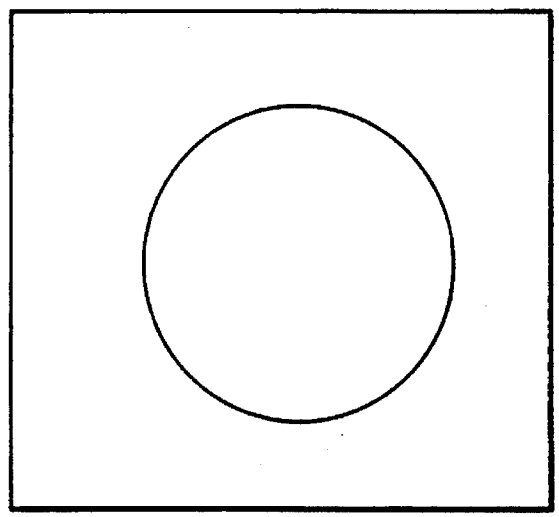
Figure 8C:
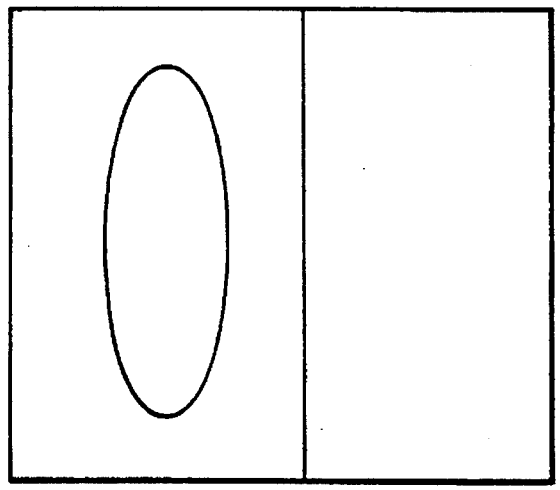

An embodiment of the imager 102 is shown in FIG. 3. In the construction shown in FIG. 3 light inputted through the lens 101 to the imager 102 is subjected to photo-electric conversion by, for example, a photo diode 301. A converted signal charge is transferred through a vertical CCD 302 to a horizontal CCD 303, and in synchronization with a horizontal scanning pulse a supplied from the timing pulse generator 104. The transferred signal is subjected to voltage conversion and outputted as a signal.

The output signal of the image pickup element 102 is converted by the A/D converter 103 into a sampled digital signal in accordance with a timing pulse supplied from the timing pulse generator 104. The signal converted into a digital signal by the A/D converter 103 is converted into a video signal by the video signal processing circuit 105 carrying out known processing such as A-correction. The output video signal of the video signal processing circuit 105 representative of the image to be displayed is enlarged in the horizontal direction so that the image is converted to the correct aspect ratio for the display and outputted as a video signal by the electronic zoom signal processing circuit 106 which is controlled by the timing pulse generator 104. The video signal outputted from the electronic zoom processing circuit 106 is inputted to the encoder 108 within the encoding device 107. The video signal encoded by the encoding device 107 is inputted to the first transmission I/F circuit 113 which is connected to the second transmission I/F circuit 114 through a telephone network. The transmission I/F circuit 113 interfaces the image pickup apparatus to the telephone network and transmission I/F circuit 114 interfaces the telephone network to possible another image pickup apparatus. A signal outputted from the second transmission I/F circuit 114, is inputted to the first transmission I/F circuit 113, through the telephone network. The output signal of the transmission I/F circuit 113, is decoded by the decoder 109 within the encoding device 107 and outputted to the color signal modulation circuit 110. The output signal of the color signal modulation circuit 110 is inputted to the D/A converter 111 after modulating the color signal by the color signal modulation circuit. The video signal converted into an analog signal by the D/A converter 111 is inputted to the monitor 112 and displayed thereby.

The number of photo diodes 301 provided to the imager 102 for carrying out the photo-electric conversion of light inputted through the lens 101 is generally called an effective pixel number. When a conventional NTSC imager with the effective pixel number of 510 horizontal pixels and 492 vertical pixels is used, the frequency of the horizontal scanning pulse capable of obtaining the normal aspect ratio is 9.6 MHz. Using the horizontal scanning pulse of 9.6 MHz, an output signal shown in FIG. 4 can be obtained. The horizontal scanning pulse (HCCD CLK) is based on the horizontal and vertical SYNC signals as shown in FIGS. 7A–C. The video signal shown in FIG. 4 is derived from the output (CCD OUT) of the imager 102 shown in FIG. 7D operated conventionally with the 9.6 MHz horizontal scanning pulse. The 9.6 MHz horizontal scanning pulse particularly with the number of samples generated does not match the frequency required by the telephone network. Thus, in the first embodiment, the frequency of the horizontal scanning pulse is set to 13.5 MHz a higher speed than the 9.6 MHz frequency and corresponding to a integer number of times (two times) of the sampling frequency 6.75 MHz generated in the timing pulse generator 104. However a signal (CCD OUT) as shown in FIG. 7F produced from a currently available imager using the horizontal scanning pulse (HCCD CLK) as shown in FIG. 7E having a frequency of 13.5 MHz produces a signal which is contracted in the horizontal direction at a ratio of 9.6/13.5 in comparison to the normal aspect ratio as shown in FIG. 5. In the present invention, the output of the imager 102 is inputted to the A/D converter 103, and is converted into a digital signal having the sampling frequency of 13.5 MHz and is outputted to the video signal processing circuit 105. The video signal processing circuit 105 generates a video signal having $P_0$ (where $P_0$ is an integer greater than 1) samples contracted at a ratio of 9.6/13.5 in the horizontal direction. The electronic zoom signal processing circuit 106 produces an enlarged video signal having P (where P is an integer greater than 1) samples carries out an enlargement of the video signal of 13.5/9.6 of $P/P_0$ times in the horizontal direction at the sampling frequency of 13.5 MHz to produce an interpolated signal (ELE ZOOM OUT) as shown in FIG. 7G. A video signal having the normal aspect ratio in the sampling frequency of 13.5 MHz as shown in FIG. 6 is obtained from the electronic zoom processing circuit 106 which performs the enlargement operation on the video signal having $P_0$ samples output by the video signal processing circuit 105.

The enlargement performed by the electronic zoom processing circuit 106 is performed by generating more samples than that obtained using the currently available imager operated at the sampling frequency of 13.5 MHz. The generation of additional samples is performed by interpolating samples between each pair of samples obtained from the imager 102 as a function of the value of the pair of samples between which a sample is to be interpolated and the distances from each sample of the pair to the position of the sample to be interpolated. Such an interpolation operation is disclosed in "An Electronic Zoom Video Camera Using Imager Scanning Control" by T. Kinugasa, IEEE, 1991, pp. 46–49. Conversion of the sampling frequency into 6.75 MHz specified by the CIF can be easily realized, if the video signal sampling frequency of 13.5 MHz as above described is resampled at a ratio of two pieces per one piece.

In the first embodiment, when imager is to be replaced, the horizontal scanning pulse frequency of the replacement imager is made to accommodate the frequency specified by equation (1) and provided by the timing pulse generator 104.

Figure 2:
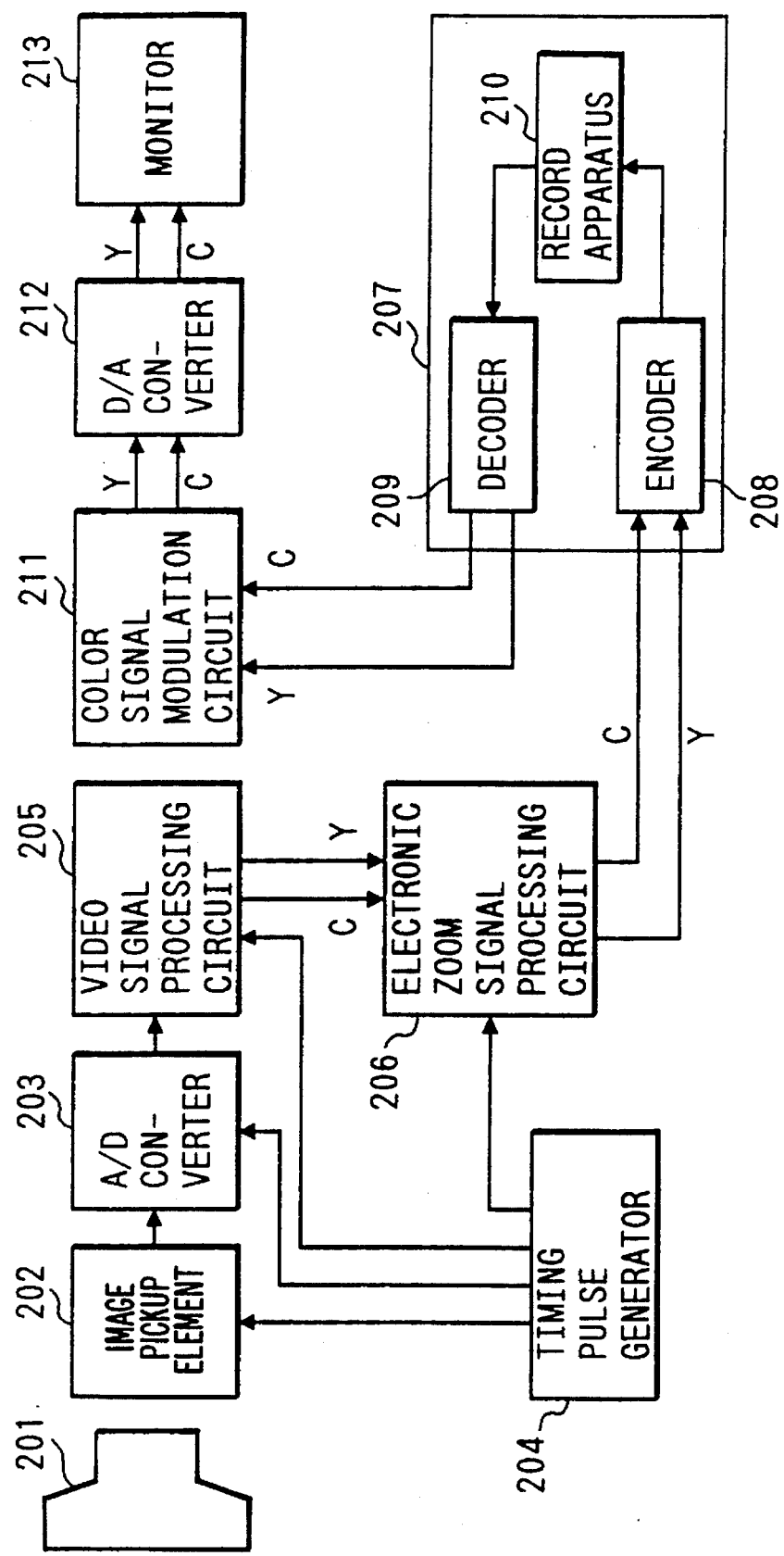
FIG. 2 is block diagram showing an image pickup apparatus according to the second embodiment of the invention.

The second embodiment of the present invention will be described using FIG. 2. In FIG. 2 the image pickup apparatus of the second embodiment includes a lens 201, an imager 202, an A/D coverter 203, a timing pulse generator 204, a video signal processing circuit 205, an electronic zoom signal processing circuit 206, a digital record apparatus 207, an encoder 208, a decoder 209, a record apparatus 210, a color signal modulation circuit 211, a color signal modulation circuit 211, a D/A converter 212 and a monitor 213. The above-described construction includes parts common with the first embodiment. The differences will be described as follows.

The encoder 208 converts the inputted digital video signal into a prescribed format, and the converted video signal is recorded in a record apparatus 210. When reproducing a video signal, conversion to video signals of Y and C (Y:luminance signal, C:Color-difference signal) is carried out from a format specified by the decoder 209, and the converted signals are outputted to the color signal modulation circuit 211.

The second embodiment of the present invention operates as follows. When a conventional NTSC imager having the effective pixel number of 510 horizontal pixels and 492 vertical pixels is used as the imager 202, the frequency of the horizontal scanning pulse capable of obtaining the normal aspect ratio is 9.6 MHz. Using the horizontal scanning pulse frequency of 9.6 MHz, the video signal as shown in FIG. 4 can be obtained. On the other hand, as shown in the above-mentioned Reference 2, the sampling frequency in a 4:2:2 digital VTR standard is 13.5 MHz. Consequently, in the second embodiment, a pulse of 13.5 MHz with higher speed than 9.6 MHz and corresponding to an integer of n times (one time) the sampling frequency of the digital record apparatus 207 is obtained as the horizontal scanning pulse from the timing pulse generator 204.

A signal contracted in the ratio of 9.6/13.5 times than the normal aspect ratio in the horizontal direction is outputted from the imager 202. The output of the imager 202 is inputted to the A/D converter 203, and is converted into a digital signal having the sampling frequency of 13.5 MHz and outputted to the video signal processing circuit 205. The video signal processing circuit 205 generates a video signal contracted at a ratio of 9.6/13.5 times in the horizontal direction as shown in FIG. 5. The electronic zoom signal processing circuit 206 carries out enlargement of signal at a ratio of 13.5/9.6 times in the horizontal direction at the sampling frequency of 13.5 MHz in the above-described manner. Consequently, a video signal having the normal aspect ratio at the sampling frequency of 13.5 MHz as shown in FIG. 6 can be obtained. In this case, since it is coincident with the sampling frequency of the 4:2:2 digital VTR standard, resampling as in the foregoing embodiment is not necessary.

Also in the second embodiment, when the imager is to be replaced, the horizontal scanning pulse of the replacement imager is set to accommodate a frequency according to the condition specified in equation (1) supplied from the timing pulse generator 204.

According to the present invention as above described, a video signal having the sampling frequency required by the CIF standard or the digital VTR standard using a currently available imager can be easily generated without using a conversion circuit of large scale or complexity. By use of the present invention connection of a TV phone to not only a digital transmission system such as a telephone network but also a digital record apparatus such as a digital VTR is possible.

Although the present invention has been illustrated and described with respect to preferred embodiments thereof, it should be understood by those of ordinary skill in the art that the forgoing and various other changes, omissions and additions may be made therein and thereto without departing from the spirit and scope of the invention.

We claim:

1. An image pickup apparatus comprising:
   a timing pulse generator for generating a horizontal scanning pulse having a frequency f;
   an image pickup element for outputting a signal in synchronization with said horizontal scanning pulse, said image pickup element having an effective pixel number requiring the horizontal scanning pulse of a frequency $f_0$ to produce the signal having a regular aspect ratio, said frequency $f_0$ being lower than said frequency f;

a video signal processing circuit for processing the signal outputted from said image pickup element and for generating a first video signal which is contracted at a ratio of $f_0/f$ in the horizontal direction; and an interpolation processing circuit for producing a second video signal having said regular aspect ratio by interpolating samples between each pair of samples of said first video signal.

2. An image pickup apparatus according to claim 1, further comprising:

encoding device for encoding said second video signal for transmission on a telephone network.

3. An image pickup apparatus according to claim 2, further comprising:

a transmission interface circuit for interfacing said encoding device to said telephone network.

4. An image pickup apparatus according to claim 2, wherein said encoding device includes an encoder for encoding said second video signal for transmission on said telephone network and a decoder for decoding the signal received from said telephone network.

5. An image pickup apparatus according to claim 4, further comprising:

a color signal modulation circuit for modulating a decoded signal from said decoder;

a digital to analog (D/A) converter for converting a modulated signal from said color signal modulation circuit to an analog signal; and a monitor for displaying said analog signal as an image thereon.

6. An image pickup apparatus according to claim 1, further comprising:

an encoder for sampling at a sampling frequency $f_1$, said second video signal in a predetermined format, wherein said frequency f is an integer number n times said sampling frequency $f_1$.

7. The image pickup apparatus according to claim 6, further comprising:

an encoding device which encodes the second video signal and decodes a signal inputted thereto, said encoding device comprises:

said encoder, and a decoder for decoding said signal inputted thereto having said predetermined format.

8. An image pickup apparatus according to claim 7, further comprising:

a recording apparatus for recording an encoded signal from said encoder on a recording medium and reproducing information from said recording medium and supplying said information as said signal to said decoder.

9. An image pickup apparatus according to claim 8, further comprising:

a color modulation circuit for modulating a decoded signal from said decoder;

a D/A converter for converting a modulated signal from said color modulation circuit into an analog signal; and a monitor for displaying said analog signal as an image thereon.

10. An video image data processing method for converting a format of a video image data into another format, comprising the steps of:

storing the video image data according to a first format requiring a sampling frequency $f_0$ to reproduce a signal having a normal image;

reading the video image data with a sampling frequency f which is higher than said frequency $f_0$;

generating a first video signal which contains the video image data contracted at a ratio of $f_0/f$ in the horizontal direction, the first video signal having the sampling frequency f; and interpolating samples between a pair of samples of the video image data of the first video signal for producing a second video signal which contains the video image data in the normal image, the second video signal conforming to a second format requiring the sampling frequency f to reproduce the signal having the normal image.

11. A video image data processing method according to claim 10, further comprising the step of encoding said second video signal for transmission on a telephone network.

12. A video image data processing method according to claim 10, further comprising the step of sampling at a sampling frequency $f_1$, said second video signal in a third format, wherein said frequency f is an integer number n times said sampling frequency $f_1$.

13. A video image data processing method according to claim 10, further comprising the steps of:

recording said second video signal on a recording medium.

14. A video image data processing method for converting NTSC format of a video image data into CIF format, comprising the steps of:

storing the video image data according to the NTSC format requiring a sampling frequency 9.6 MHz to reproduce a signal having a normal image;

reading the video image data with a sampling frequency 13.5 MHz;

generating a first video signal which contains the video image data contracted at a ratio of 9.6/13.5 in the horizontal direction, the first video signal having the sampling frequency 13.5 MHz;

interpolating samples between each pair of samples of the video image data of the first video signal for producing a second video signal which contains the video image data in the normal image, the second video signal having the sampling frequency 13.5 MHz; and sampling at a sampling frequency 6.75 MHz, said second video signal in the CIF format.

15. A video image data processing method according to claim 14, further comprising the step of encoding said second video signal for transmission on a telephone network.

16. A video image data processing method for converting NTSC format of a video image data into a digital VTR format, comprising the steps of:

storing the video image data according to the NTSC format requiring a sampling frequency 9.6 MHz to reproduce a signal having a normal image;

reading the video image data with a sampling frequency 13.5 MHz;

generating a first video signal which contains the video image data contracted at a ratio of 9.6/13.5 in the horizontal direction, the first video signal having the sampling frequency 13.5 MHz;

interpolating samples between each pair of samples of the video image data of the first video signal for producing a second video signal which contains the video image data in the normal image, the second video signal conforming to the digital VTR format requiring the sampling frequency 13.5 MHz to reproduce the signal having the normal image; and recording said second video signal on a recording medium.

17. An image pickup apparatus comprising:

an image pickup element for providing image data having a prescribed format when read out at a predetermined frequency;

readout means for reading out said image data from said image pickup element at a frequency which is different from said predetermined frequency corresponding to said prescribed format;

an analog to digital (A/D) converter for converting said image data read out by said readout means into a digital signal; and signal processing means for processing said digital signal converted by said A/D converter and outputting an image signal having another format, corresponding to said frequency, which is different from said prescribed format.

* * * * *